United States Patent
Shah

(10) Patent No.: US 8,301,545 B1
(45) Date of Patent: Oct. 30, 2012

(54) METHOD AND APPARATUS OF ANALYZING SOCIAL NETWORK DATA TO IDENTIFY A FINANCIAL MARKET TREND

(75) Inventor: Charles Shah, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/104,769

(22) Filed: May 10, 2011

(51) Int. Cl.
*G06Q 40/00* (2012.01)
(52) U.S. Cl. ............................ 705/37; 705/35; 705/36 R
(58) Field of Classification Search ................... 705/35, 705/36 R, 37
See application file for complete search history.

(56) References Cited

U.S. PATENT DOCUMENTS

| | | | |
|---|---|---|---|
| 7,567,927 B2 * | 7/2009 | Boglaev | 705/35 |
| 7,818,232 B1 * | 10/2010 | Mead et al. | 705/36 R |
| 7,908,204 B2 * | 3/2011 | Boglaev | 705/37 |
| 7,921,046 B2 * | 4/2011 | Parsons et al. | 705/35 |
| 8,170,942 B2 * | 5/2012 | Mead et al. | 705/36 R |
| 2002/0095362 A1 * | 7/2002 | Masand et al. | 705/35 |
| 2003/0172023 A1 * | 9/2003 | Kokis et al. | 705/37 |
| 2008/0243675 A1 * | 10/2008 | Parsons et al. | 705/37 |
| 2010/0131398 A1 * | 5/2010 | Molloy et al. | 705/35 |
| 2010/0257117 A1 * | 10/2010 | Shvadron et al. | 705/36 R |
| 2011/0040701 A1 * | 2/2011 | Singla et al. | 705/36 R |
| 2011/0178911 A1 * | 7/2011 | Parsons et al. | 705/35 |
| 2011/0178912 A1 * | 7/2011 | Parsons et al. | 705/35 |
| 2011/0178917 A1 * | 7/2011 | Parsons et al. | 705/37 |
| 2011/0178918 A1 * | 7/2011 | Parsons et al. | 705/37 |
| 2011/0178919 A1 * | 7/2011 | Parsons et al. | 705/37 |
| 2011/0178957 A1 * | 7/2011 | Parsons et al. | 705/36 R |
| 2011/0184844 A1 * | 7/2011 | Parsons et al. | 705/35 |
| 2012/0041890 A1 * | 2/2012 | Ng | 705/36 R |

* cited by examiner

*Primary Examiner* — Jagdish Patel
*Assistant Examiner* — Sara C Hamilton
(74) *Attorney, Agent, or Firm* — James J. DeCarlo; Greenberg Traurig, LLP

(57) ABSTRACT

In general, the present disclosure includes a system, method and architecture for use in analyzing content of a social network data to identify a financial market trend, e.g., a trend associated with a financial market instrument.

21 Claims, 8 Drawing Sheets

Pseudo Code:

Convention used in code:
[ ] : indicative of a configurable value
<> : indicative of a value in the loop.

1. for each "<ticker>" data received in the [ last hour ]" : do
   {
2. Filters (optional):
   2a. ignore, if the number of comments received for the <ticker> is less than [ 3 ]
   2b. ignore, if the [ 3 month ] average trading volume of the <ticker> is below the threshold of [ 1000000 ]
   2c. ignore, if the comments from a particular provider in the last [ hour ] exceeds [ 80% ]
   2d. ignore, if the comments from a particular user in the last [ hour ] exceeds [ 80% ]
3. Calculate the average amount of comments received in [ an hour ] over the past [ one week ]
   3a. e.g.: <ticker> = YHOO, avg = 10
4. Calculate the increase in percentage of the data received in the [ past hour ] over the average calculated in step 3.
   4a. e.g.: %increase = ((<current count> − avg) / avg) * 100 = (25 − 10) / 10 * 100 = 150)
5. Store the percentage increase corresponding to the ticker
   }
6. Sort the data by descending order of percentage
7. Select top [ 10 ] tickers for presentation
8. If there is not enough data for top [ 10 ] tickers, backfill the list from the data obtained in the previous run, which is stored in a data store.
9. Store the top [ 10 ] list in the data store (e.g., mysql database)

FIGURE 3

METHOD AND APPARATUS OF ANALYZING SOCIAL NETWORK DATA TO IDENTIFY A FINANCIAL MARKET TREND

FIELD OF THE DISCLOSURE

The present application relates to analyzing social data, such as without limitation tweets, comment streams, user comments, etc., to identify a financial market trend, and more particularly to analyzing social data to identify a social data trend for purposes of analyzing a financial market trend, a trend associated with a trade, investment, and/or exchange, such as may occur in connection with a stock, bond, commodity, currency, derivative, index or other instrument, e.g., financial market instrument, of value.

BACKGROUND

Financial investors can use trends, e.g., trading trends, to identify investment opportunities, or lack thereof. For example, an investor might elect to invest, e.g., in a stock, mutual fund, bond, index, etc., if the investor believes that the item's price is about to, or has begun, trending upward; and conversely, the investor might elect to sell the item if the item is about to, or has begun, trending downward. Some conventional approaches use current and historic objective information, e.g., volume of trades, price, price volatility, etc., to make predictions.

SUMMARY

The present disclosure seeks to address failings in the art and to provide a method and apparatus of analyzing social network data to identify a financial market trend, e.g., a trend associated with a financial market instrument, which information can be used, for example, to decide whether to trade a financial market instrument. By way of some non-limiting examples, a trend might be associated with a trade, investment, and/or exchange, such as may occur in connection with a stock, bond, commodity, currency, derivative, index or other instrument, e.g., financial market instrument, of value. In accordance with one or more embodiments, a textual analyzer can be used to determine sentiment of a message, e.g., bullish, bearish or neutral sentiment for the financial market instrument.

In accordance with at least one aspect, a method is provided, the method comprising determining, via at least one computing device and for a financial market instrument, a number of messages of a plurality of messages occurring during a time span and containing a reference to the financial market instrument, the plurality of messages including messages from at least one social networking service; determining, via the at least one computing device and for the financial market instrument, a time span average, the time span average being a ratio of the determined number of messages occurring during the time span and containing the financial market instrument reference over a number of time intervals into which the time span is divided; determining, via the at least one computing device and for the financial market instrument, a message count for a selected time interval of the time intervals, the selected time interval's message count indicating a number of the messages from the plurality of messages occurring during the selected time interval and containing the reference to the financial market instrument; determining, via the at least one computing device and for the financial market instrument, a percentage change using the selected time interval's message count and the time span average; comparing, via the at least one computing device, a plurality of percentage changes corresponding to a plurality of financial market instruments including the financial market instrument, the comparing selecting a set of financial market instruments, each of the selected financial market instruments having a greater percentage change than unselected ones of the plurality of financial market instruments; and causing, via the at least one computing device, the financial market instrument reference of each of the selected financial market instruments to be available for presentation to one or more users.

In yet another aspect, a system is provided, which comprises at least one computing device comprising one or more processors to execute and memory to store instructions to determine, for a financial market instrument, a number of messages of a plurality of messages occurring during a time span and containing a reference to the financial market instrument, the plurality of messages including messages from at least one social networking service; determine, for the financial market instrument, a time span average, the time span average being a ratio of the determined number of messages occurring during the time span and containing the financial market instrument reference over a number of time intervals into which the time span is divided; determine, for the financial market instrument, a message count for a selected time interval of the time intervals, the selected time interval's message count indicating a number of the messages from the plurality of messages occurring during the selected time interval and containing the reference to the financial market instrument; determine, for the financial market instrument, a percentage change using the selected time interval's message count and the time span average; compare a plurality of percentage changes corresponding to a plurality of financial market instruments including the financial market instrument, the comparing selecting a set of financial market instruments, each of the selected financial market instruments having a greater percentage change than unselected ones of the plurality of financial market instruments; and cause the financial market instrument reference of each of the selected financial market instruments to be available for presentation to one or more users.

In a further aspect, a computer readable non-transitory storage medium is provided, the medium tangibly storing thereon computer readable instructions that when executed cause at least one processor to determine, for a financial market instrument, a number of messages of a plurality of messages occurring during a time span and containing a reference to the financial market instrument, the plurality of messages including messages from at least one social networking service; determine, for the financial market instrument, a time span average, the time span average being a ratio of the determined number of messages occurring during the time span and containing the financial market instrument reference over a number of time intervals into which the time span is divided; determine, for the financial market instrument, a message count for a selected time interval of the time intervals, the selected time interval's message count indicating a number of the messages from the plurality of messages occurring during the selected time interval and containing the reference to the financial market instrument; determine, for the financial market instrument, a percentage change using the selected time interval's message count and the time span average; compare a plurality of percentage changes corresponding to a plurality of financial market instruments including the financial market instrument, the comparing selecting a set of financial market instruments, each of the selected financial market instruments having a greater percentage change than unselected ones of the plurality of financial market instruments; and cause the financial market instrument reference of each of the selected financial market instruments to be available for presentation to one or more users.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a graphical user interface used in presenting a set of stock ticker symbols in accordance with one or more embodiments of the present disclosure.

FIG. 2 illustrates components of an exemplary system in accordance with one or more embodiments of the present disclosure.

FIG. 3 provides an example of pseudo code in accordance with one or more embodiments of the present disclosure.

FIG. 4, which comprises FIGS. 4A-4C, provides an example process flow in accordance with one or more embodiments.

DETAILED DESCRIPTION

Figure 1:
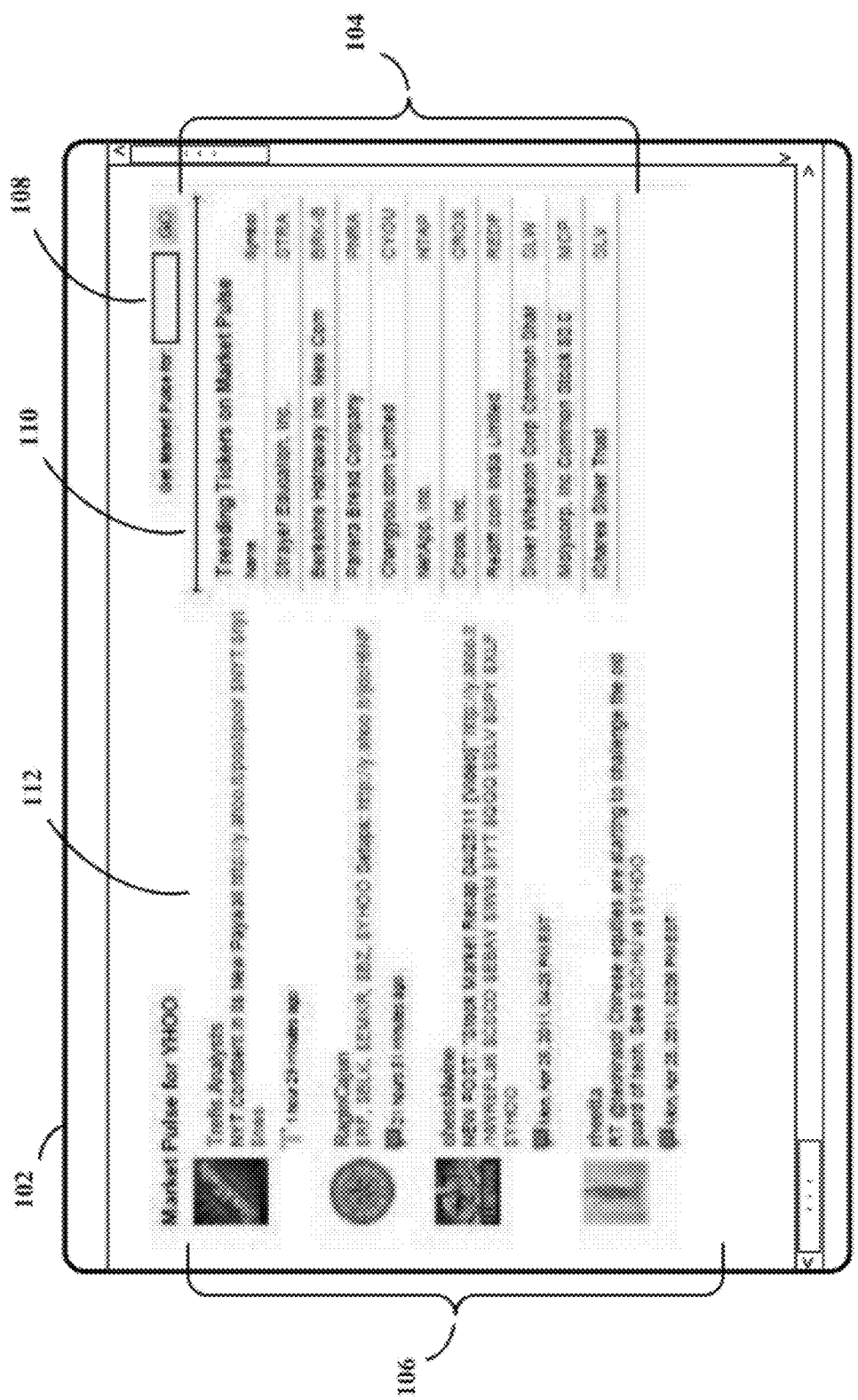

In general, the present disclosure includes a system, method and architecture, and includes a method and apparatus of analyzing social network data to identify a financial market trend, e.g., a trend associated with a financial market instrument. By way of one non-limiting example, a trend identified in accordance with one or more embodiments disclosed herein might be used to decide whether to trade a financial market instrument.

Certain embodiments of the present disclosure will now be discussed with reference to the aforementioned figures, wherein like reference numerals refer to like components.

In accordance with one or more embodiments, the social network data comprises messages, which are also referred to herein as comments, such as without limitation messages, posted to a social networking service such as Twitter®, Facebook®, Myspace®, a blogging and/or microblogging service, and may include messages that are published or otherwise made public from an instant messaging service, text messaging service, electronic mail service, etc. The messages may also include messages generated by a service that monitors financial market transactions, e.g., the service might generate a message when an officer of a company sells, or buys, some shares in the company. By way of another non-limiting example, the messages might include messages posted by a service that tracks trades made by users registered with a service, a social networking service, or trades identified by the service that are made by other entities; the social networking service posting a message containing information about each trade including a reference, e.g., a ticker symbol, for the financial institution involved in the trade. One example of such a service is provided by Covestor LLC.

Content of each of a plurality of messages occurring during, within, or in a time window, or time span, is analyzed to determine whether or not the message contains a reference to a financial market instrument, which reference is also referred to herein as a financial market instrument reference, financial market reference, instrument reference, or reference. For sake of simplicity, the reference primarily used herein is a ticker symbol, which is just one example of a financial market reference, and the financial market instrument primarily used herein is stock, which is just one example of a financial market instrument. It should be apparent that embodiments described herein apply equally to any type of financial market instrument reference and/or financial market instrument.

Using stocks and ticker symbols as an example and without limitation, for each of a plurality of stocks' ticker symbols, messages occurring during a selected window, or span, of time are analyzed to identify a number of the messages occurring during the time span and containing a stock's ticker symbol. Each message has associated temporal data, e.g., a date and time. The temporal data can be indicative of a time when the associated message is generated, received, etc., for example. For each ticker symbol identifying a stock, a time span average is determined using the number of messages occurring during the time span and containing the ticker symbol and a number of time intervals into which the time span is divided. One of the time intervals is selected, e.g., the most recent time interval in the time span. By way of one non-limiting example, the time span might be one week, e.g., the prior week including the current day, and the selected time interval might be the last hour of the current day in the time span. It should be apparent that any time span, number of time intervals and selected time interval can be configurable.

For the selected time interval, e.g., the most recent time interval in the time span, the messages occurring during the selected time interval are analyzed to identify the number of messages occurring during the selected time interval and containing a stock's ticker symbol. For each stock's ticker symbol identified in the messages, a percentage change is determined for the selected time interval and the stock's ticker symbol as a ratio of the number of the messages occurring during the selected time interval and containing the stock's ticker symbol over the time span average.

A number, n, of the stocks can be selected for presentation to users based on a comparison of the percentage change values determined for the stocks in accordance with one or more embodiments. By way of a non-limiting example, the percentage change is a percentage increase, which reflects an uptick, or upward trend, in attention to the stock as determined by analyzing the messages, including social networking service messages. In accordance with one or more embodiments, the financial market instrument reference, e.g., ticker symbol, associated with each of the n selected financial market instruments is saved, and can be selected for presentation to users. In a case that the percentage change is a percentage increase, the financial market reference for each of the n financial market instruments having the greatest percentage increase relative to the percentage increases associated with the other financial market instruments are presented to the user. By way of a non-limiting example, the ticker symbols associated with the top n stocks, e.g., the n stocks with the greatest percentages increase relative to the other stocks that were considered, are presented. It should be apparent that embodiments of the present disclosure are not limited to a percentage increase; and that a percentage decrease or no change can be used as selection criteria.

In accordance with at least one embodiment, selection of a financial market instrument reference is based on a percentage change, e.g., percentage change in volume or acceleration, rather than message volume. To illustrate, assume that a first financial market instrument, on average, is referenced in 100 messages per hour over the past week and 110 messages in the last hour, and a second financial market instrument, on average, is referenced in 5 messages per hour over the past week and 50 messages in the last hour. Using either the average volume, or the raw message count for the last hour, as the selection criteria, the first financial market instrument is selected over the second. A percentage increase as determined using embodiments of the present invention show a much greater increase in volume for the second financial market instrument, i.e., 900% increase in volume in the last hour over the average volume per hour, relative to the 10% percent increase in volume for the first financial market instrument. By comparison, the second financial market instrument's percentage increase indicates that the second financial market instrument signifies a greater acceleration and is more trending in the last hour than the first, even though the volume of messages for the second financial market instrument is less than the first. In accordance with one or more embodiments, a trend, or change such as is determined by a percentage change metric, can be identified for a financial market instrument relative to the instrument's own message volume, and the instrument's trend is compared with trends of other instruments to identify a set of instruments for presentation.

FIG. 1 provides an example of a graphical user interface (GUI) used in presenting a set of stock ticker symbols in accordance with one or more embodiments of the present disclosure. GUI 102 includes a listing 104 identifying ten of the financial market instrument references, ticker symbols determined in accordance with at least one embodiment of the present disclosure. In the example shown in FIG. 1, the listing includes the financial market entities, e.g., companies, associated with the ticker symbols. It should be apparent that the listing can contain fewer or more references than that shown in listing 104. In the example shown in FIG. 1, listing 104 is a portion 110 of GUI 102. GUI 102 includes at least one other portion, portion 112, which includes a listing 106 of messages, e.g., sorted based on time. While only four messages are shown in the example, it should be apparent that GUI 102 can include additional messages, and that the user can use the scrolling capabilities of GUI 102 to view additional messages. While not shown in FIG. 1, GUI 102 can include an option selectable by the user to obtain additional messages and/or trending tickers for presentation in GUI 102.

In the example of FIG. 1, the messages shown in listing 106 includes messages containing a specific ticker symbol, YHOO. It should be apparent that listing 106 could include messages containing one or more other ticker symbols. By way of one non-limiting example, field 108 can be used by a user to display messages containing one or more ticker symbols input using field 108. In response, listing 106 can be updated to include messages, each of which contains at least one of the one or more ticker symbols specified by the user. To illustrate further and without limitation, each ticker symbol in listing 104 might be selectable by the user to view messages, as displayed in listing 106, which contain the ticker symbol selected from listing 104. Alternatively, a ticker symbol in listing 104 might be used to display additional information about the associated financial market entity, e.g., in a portion of the same or a different web page. In the example, each ticker symbol contained in a message is a hyperlink, which might be used to display messages containing the ticker symbol in listing 106 and/or to view additional information about the financial market entity, e.g., company, associated with the ticker symbol. GUI 102 can include additional links, or hyperlinks, e.g., a hyperlink to content and/or a web page. A hyperlink can be included in a message contained in listing 106, and/or in an entry contained in listing 104, for example.

In the example shown in FIG. 1, each message includes a hyperlink at the beginning of the message. By way of a non-limiting example, in a social networking message, the hyperlink might be used by the user viewing GUI 102 to navigate to a web page served by one of the social networking service providers, e.g., a social networking service provider that provided the message; the web page might contain information associated with the user that posted the message with the service provider, and might further allow the user of GUI 102 to connect with the message originating user, e.g., view information about the message originating user and/or follow the message originating user. By way of another non-limiting example, in a case that the message is generated by the service providing the message, the hyperlink might be used to display a web page containing information about the service, e.g., a financial news service, which provided the message.

Each message shown in the example includes temporal information, e.g., information indicating a time and in some cases a date, e.g., in a case that the message occurred before the current day/date. In the example, the temporal information is shown below the message. Additionally, in the example, the source, or service provider, of the message is indicated, e.g., the icon shown to the left of the temporal information.

In accordance with one or more embodiments, listing 104 is updated on a period basis, e.g., every ten minutes, every hour, etc. The time period is configurable, and may be based on the volume of messages being received, volatility of one or more financial markets, etc.

Figure 2:
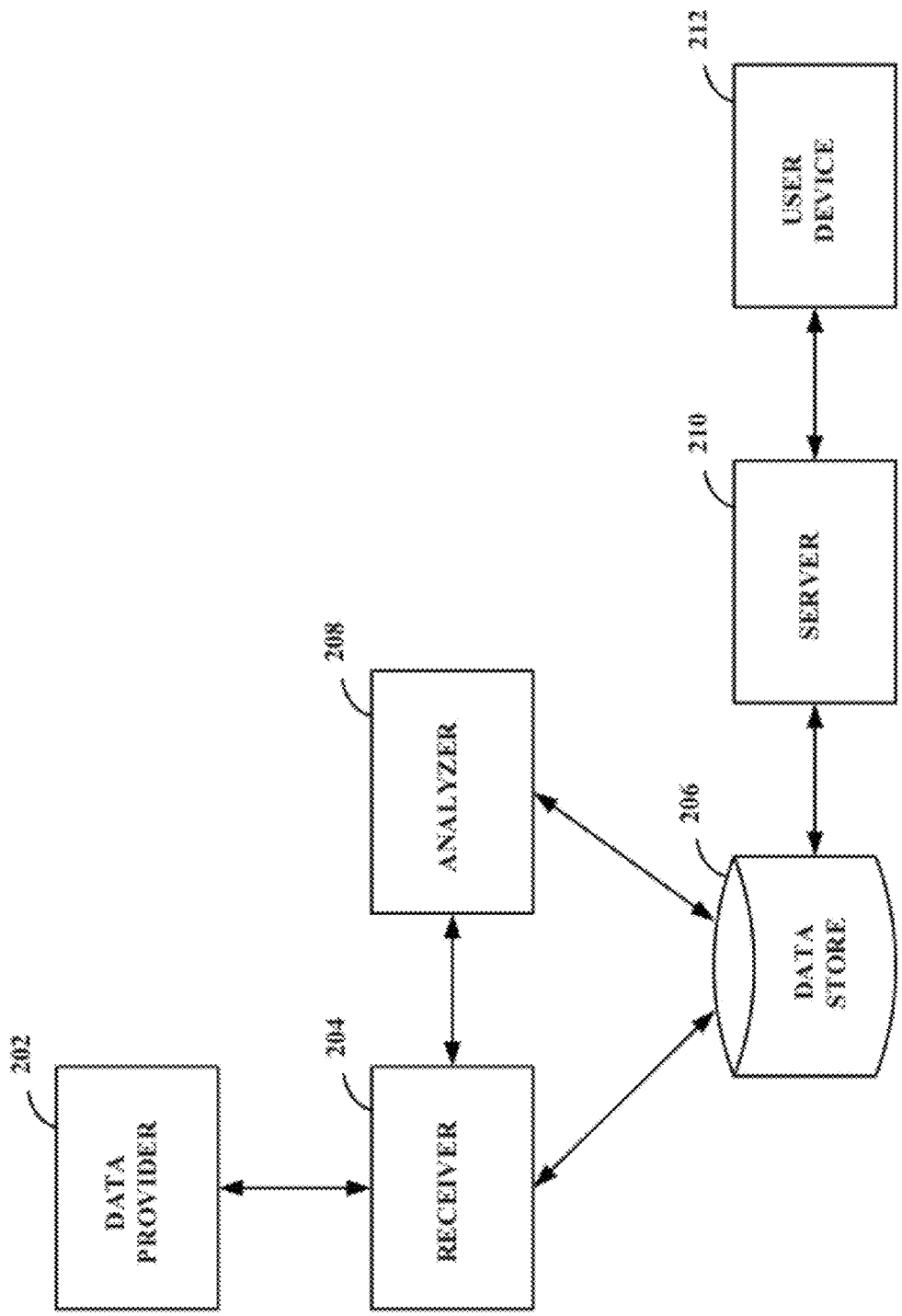

FIG. 2 illustrates components of an exemplary system in accordance with one or more embodiments of the present disclosure. In accordance with one or more such embodiments, one or more data providers 202, e.g., social networking service, news service, etc., provide messages containing financial market instrument references to receiver 204. In accordance with one or more embodiments, each message that is received has associated temporal information, e.g., a time stamp, which can be provided by the data provider 202 or generated by receiver 204. The time stamp might indicate a time that the message is posted by a user or server, and/or the time that the message is received by receiver 204. As discussed above, each message can include, or have associated therewith, information to identify the service provider 202, the user generating the message, and one or more financial market instrument references.

The received data is stored in data store 206 and is used by analyzer 208 to identify a set of financial market instrument references. The set of references identified by analyzer 208 can be stored in data store 206, and retrieved by server 210 for inclusion in a web page, e.g., GUI 102, that is served to user device 212 for presentation to a user of device 212.

Each of data provider 202, receiver 204, analyzer 208, server 210 and user device 212 comprises at least one computing device. As is described in more detail below, a computing device can comprise one or more processing units. Data store 206 includes memory to store data and may comprise a computing device. Data store 206 can comprise more than one data store, and may be integrated into one or more of the other components shown in FIG. 2. Additionally and while the components are shown separately, it should be apparent that one or more of the components shown in FIG. 2 can be combined to form one component.

FIG. 3 provides an example of pseudo code for use in accordance with one or more embodiments of the present disclosure. The pseudo code provided in FIG. 3 can be used by analyzer 208 to generate the set of financial market instrument references, for example.

In the example shown in FIG. 3, "[ ]" brackets are used to indicate a configurable value, and "< >" brackets are indicative of a value in a loop. A loop begins at step 1 and includes steps 2 through 5, which are repeated for each financial market instrument reference found in messages provided by data providers 202. In the example, a financial market instrument reference is referred to as a "ticker". The loop is performed for each ticker received in the last hour. The time span of the last hour is configurable.

Step 2, which includes steps 2a-2d, is optional and can be used to filter messages. Step 2a, for example, can be used to filter out a ticker symbol if the number of messages, or comments, containing the ticker symbol is less than the configurable threshold number of messages, e.g., three messages. Another optional filter is shown in step 2b, which filters out messages that contain a ticker symbol associated with an instrument, e.g., a stock, which has an average trading volume below a configurable threshold, e.g., one million in the pseudo code example. Step 2c optionally filters out the messages received from a data provider 202 if the number of messages from the data provider 202 in a configurable time interval, e.g., last hour, exceeds a configurable threshold number, e.g., 80%, of the comments received in the configurable time span. Step 2d optionally filters out messages received from a user if the number of messages from the user in a configurable time interval, e.g., last hour, exceeds a configurable threshold number, e.g., 80%, of the comments received in the configurable time span.

At step 3, an average number of messages received is determined. By way of one non-limiting example, the average is determined to be the number of messages received in a configurable time span, e.g., one week, divided by the number of time intervals in the time span, e.g., the time interval in the pseudo code example is configurable and is set to one hour. Step 3a provides one example in which the average for the YHOO ticker symbol is determined to be 10, e.g., 1680 messages÷(24*7 hours in one week)=10.

At step 4, a percentage change, e.g., a percentage increase, is determined using the average determined in step 3 and a number of the messages occurring during the last interval, e.g., last hour, of the time span, e.g., one week. In the example shown in step 4a, the percent increase is determined by dividing the result of subtracting the time span average determined in step 3 from the number of messages occurring during the last hour by the time span average, and multiplying that result by 100. At step 5, the percent increase is stored together with the ticker symbol.

In the example pseudo code in FIG. 3, the loop is executed hourly for the messages that occur, e.g., are received, during the last hour. Step 5 can also save the count of messages occurring during the last hour and containing a given ticker symbol, and the number, or count, of messages occurring during the last week and containing the ticker symbol can be determined by aggregating the count determined for the last hour and the counts determined for each hour before that, since each of the determined is stored in step 5.

With reference to step 6 of the sample pseudo code, the ticker symbols are sorted in descending order by their respective percentage increases. A number, e.g., ten, of the top, e.g., first, ticker symbols in the sorted ticker symbols are selected for presentation at step 7. Each of the ticker symbols selected in step 7 has a percentage increase that is greater than the percentage increase of all of the unselected ticker symbols. At step 8, in a case that the selected number of ticker symbols does not meet the desired number of ticker symbols, ticker symbols selected in a previous execution of the pseudo code, e.g., the hour just prior to the last hour, can be selected for inclusion in the set of ticker symbols, e.g., below the ticker symbols selected in the current execution of the pseudo code, and the set of ticker symbols as selected in step 7, and possibly in step 8 as well, can be stored, e.g., in data store 206.

Figure 4A:
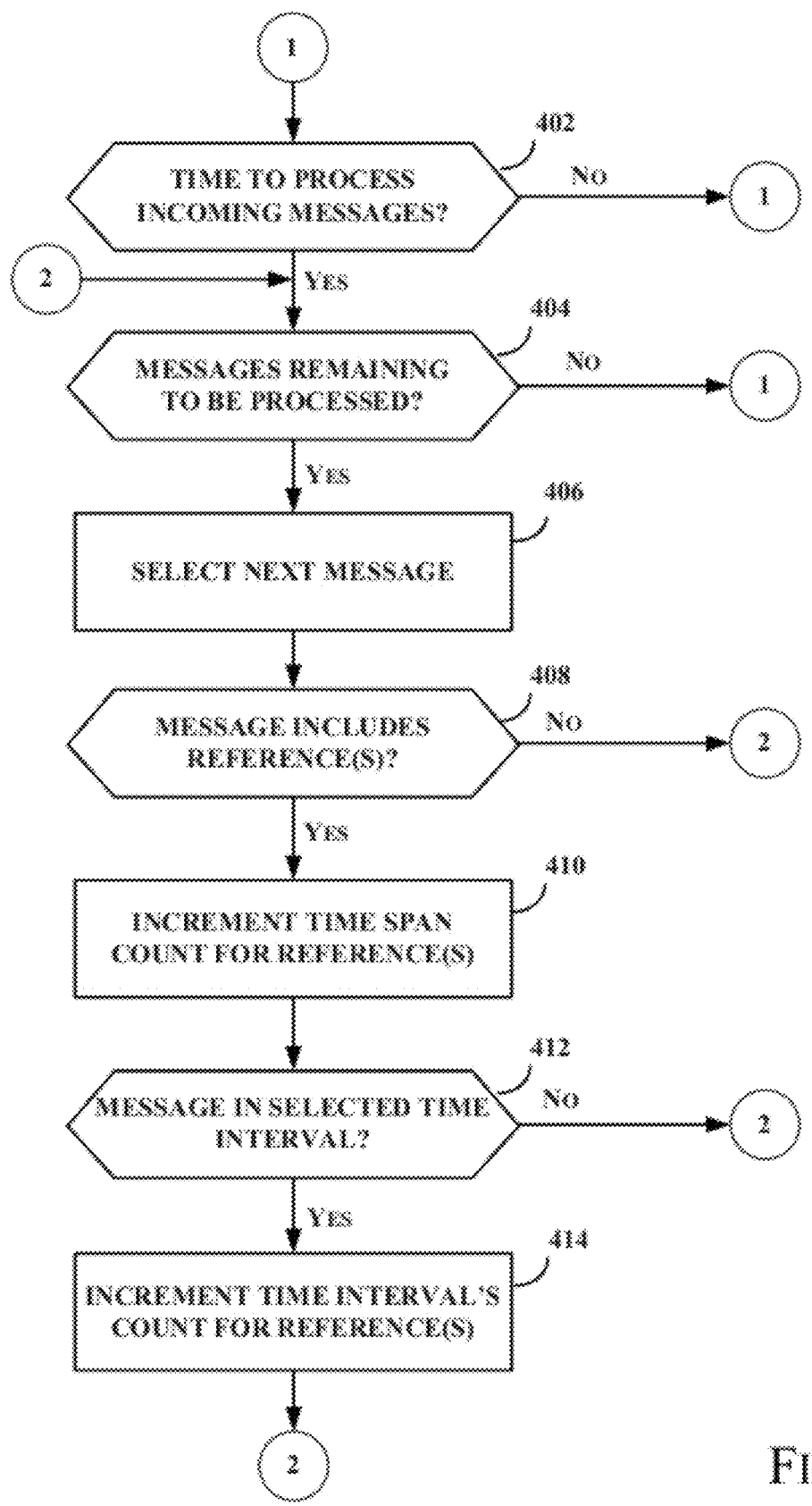
Figure 4B:
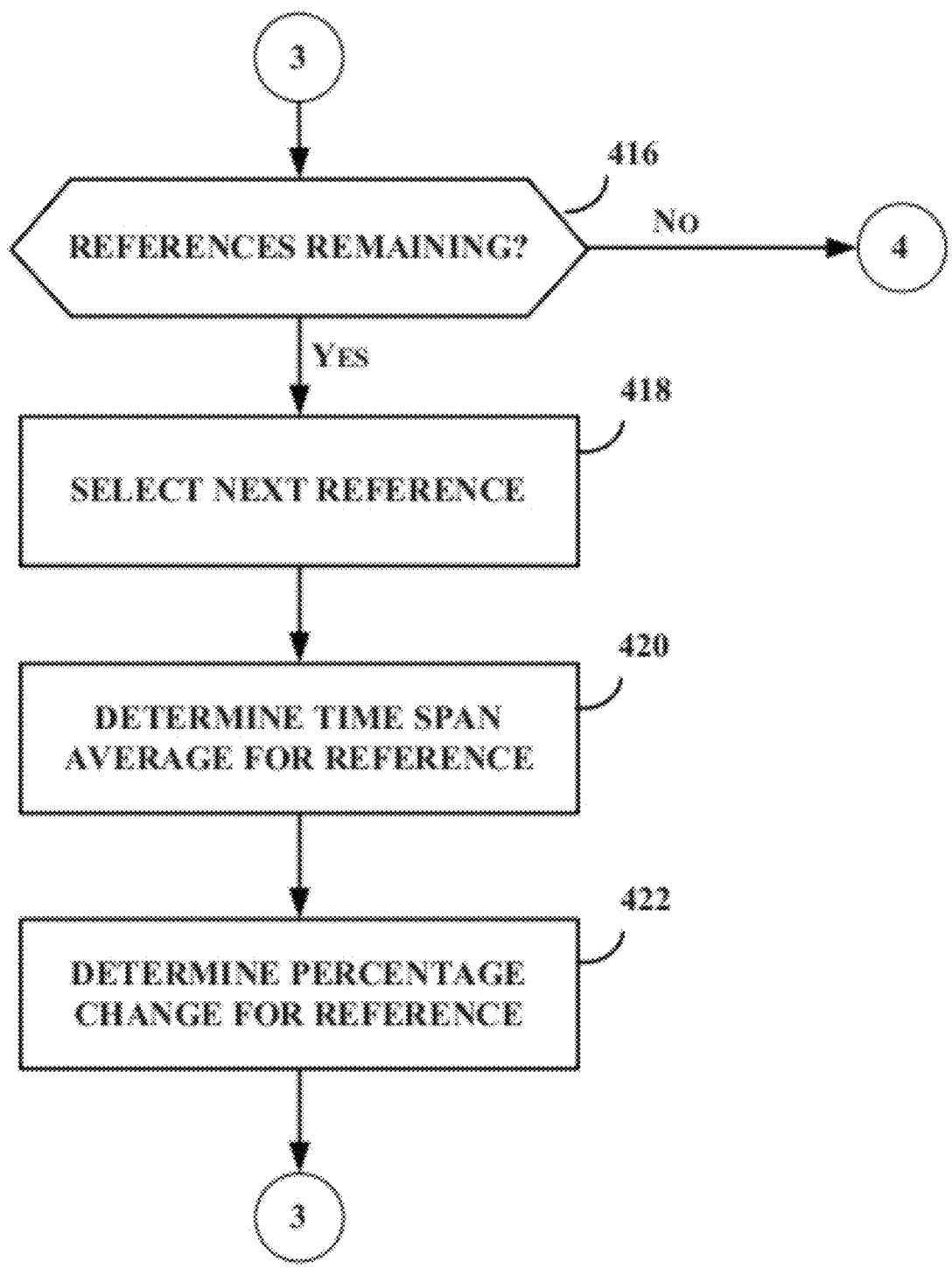
Figure 4C:
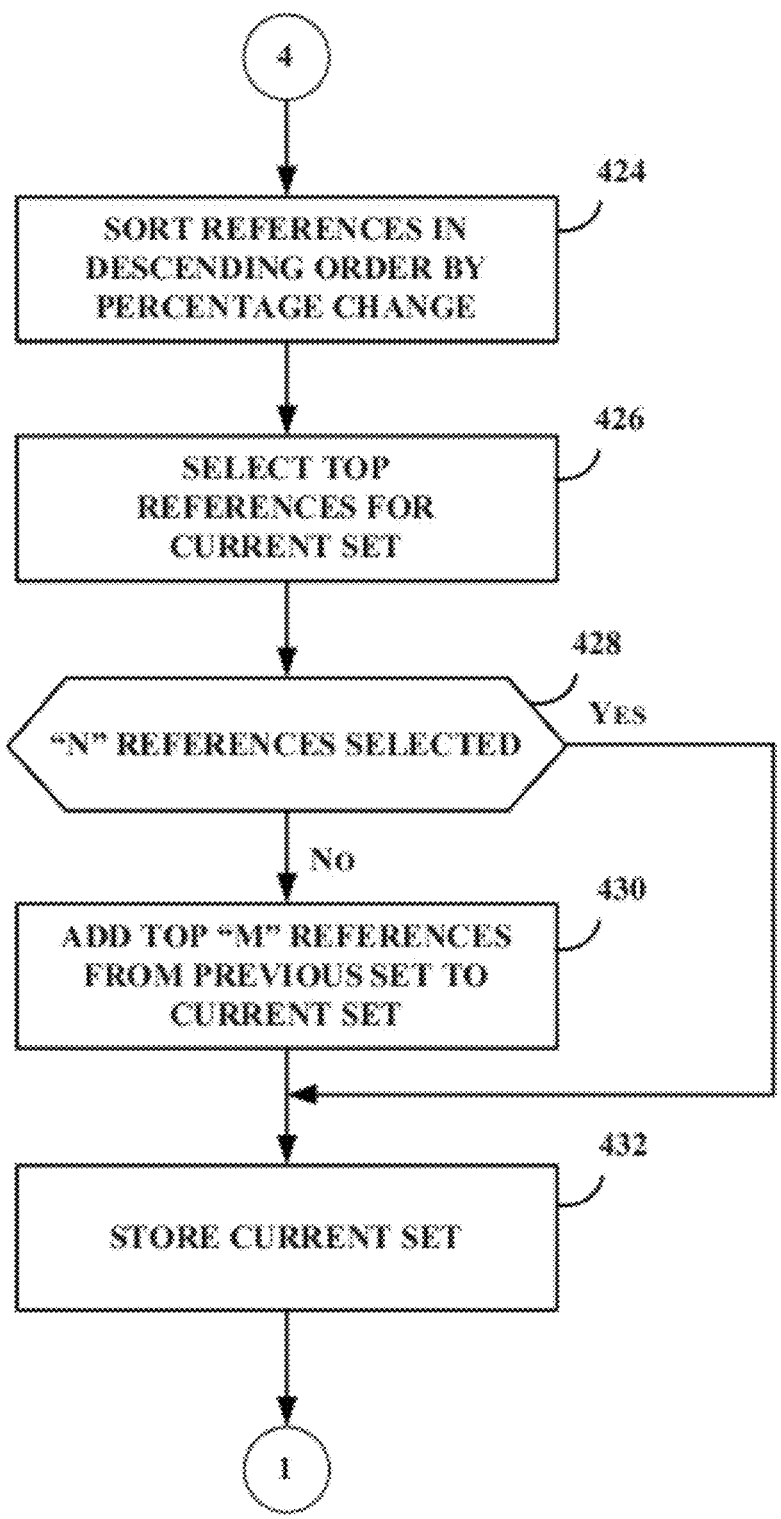

FIG. 4, which comprises FIGS. 4A-4C, provides an example process flow in accordance with one or more embodiments. With reference to FIG. 4A, the process flow, which can be executed by analyzer 208, analyzes messages received from one or more data providers 202 to count the messages that include a financial market instrument reference, such as a ticker symbol. At step 402, a determination is made whether or not to process incoming messages, e.g., messages received from data providers 202. By way of a non-limiting example, the process flow shown in FIG. 4A can be executed periodically, e.g., every ten minutes, every hour, etc., and the period can be configurable. The process flow shown in FIG. 4A can be executed on the messages received since the last time the process flow was executed, for example. If it is determined that it is time to process received messages, processing continues at step 404, which determines whether or not there are any remaining messages to be processed. If so, processing continues at step 406 to select the next message to be processed.

At step 408, a determination is made whether or not the message includes a financial market instrument reference or references, e.g., ticker symbol(s). By way of one non-limiting example, the message can be parsed to determine whether or not the message contains a reference. If not, processing continues at step 404 to process any remaining messages. If the message includes one or more financial market instrument references, processing continues at step 410 to increment the time span count for each financial market instrument reference contained in the current message, and processing continues at step 412. A determination is made, at step 412, whether the message occurred during the selected time interval, e.g., the last hour. If not, processing continues at step 404 to process any remaining messages. If so, processing continues at step 414 to increment the time interval's count for each reference contained in the current message. Processing continues at step 404 to process any remaining messages.

If it is determined, at step 404, that the all of the messages to be processed in this process flow execution, or run, have been processed, processing continues at step 416 of FIG. 4B. The process flow shown in FIG. 4B can be performed by analyzer 208, for example. The steps of the process flow can include some or all of the steps of the loop shown in FIG. 3, for example. At step 416, a determination is made whether or not any references remain to be processed. If so, processing continues at step 418 to select the next reference. At step 420, a time span average is determined for the selected reference and the current time span, e.g., past week as discussed herein in connection with step 3a of FIG. 3. At step 422, a percentage change, e.g., percentage increase, is determined, e.g., such as in step 4a of FIG. 3 discussed herein. Processing continues at step 416 to determine whether any references remain to be processed.

If not, processing continues at step 424 of FIG. 4C. The process steps shown in FIG. 4c can include some or all of steps 6 through 9 of FIG. 3 and be performed by analyzer 208, for example. At step 424, the references are sorted in descending order based on the references' percentage change. At step 426, a number, "n", of the top references are selected for the current set of references, e.g., a set of trending references. In some cases, the sorted references may not include "n" references, such that the number of the top references selected may be less than "n". At step 428, a determination is made whether or not "n" references were selected in step 426. If not, processing continues at step 430 to add a number, "m", of the top references selected from a previous set of references to the current set of references. By way of a non-limiting example, "m" is equal to "n−x", where "x" is the number of references selected in step 426. Processing continues at step 432 to store the current set of references.

In accordance with one or more embodiments, a textual analyzer can be applied to the messages received by receiver 204 and/or analyzed by analyzer 208. In accordance with one or more such embodiments, the textual analyzer can be used to determine a sentiment of one or more of the received messages. By way of one non-limiting example, the sentiment analyzer can be a component of analyzer 208, and can used to identify a bullish, bearish or neutral sentiment associated with one or more financial market instruments and corresponding references from messages received by receiver 204.

The sentiment analyzer can be trained to predict sentiment, e.g., expressed or implied sentiment, in a message using training data. The training data can include a training set of messages, which are analyzed, e.g., words parsed from the messages associated with sentiment. The training set can include input from human judges identifying a message's sentiment. The trained predictor, or model, can be a probabilistic model, e.g., Bayesian network, which receives input, e.g., words extracted from a message, and provides a sentiment prediction. Based on the predicted sentiment of a message, it is possible to check the correlation of the sentiment with the actual market price of the financial market instrument referenced in the message.

In accordance with one or more embodiments, output of the sentiment analyzer can be used in combination with the percentage change to determine whether a financial market instrument reference is trending up, down, or is neutral. By way of one non-limiting example, for the top "n" selected financial market instrument references determined to be trending upward, each of the references can have an associated percentage increase and "bullish" prediction value. For each reference, the sentiment prediction value can be determined based by the sentiment analyzer using the messages occurring during the time span and containing the reference. The references can be sorted based on each reference's percentage increase and sentiment prediction, with the top "n" references being selected using both the percentage increase and the sentiment prediction for each reference. In accordance with one or more embodiments, the percentage increase and sentiment prediction can be a combined value, e.g., the sentiment prediction can be applied as a weight to the percentage increase. In accordance with one or more such embodiments, and by way of one non-limiting example, the sentiment prediction can have a value on a scale between "1" and "−1", with a "bullish" sentiment equal to "1", a neutral sentiment equal to "0" and a "bearish" sentiment equal to "−1".

In accordance with one or more embodiments, the percentage increase, alone or in combination with the sentiment prediction, can be determined for a market index as a financial market instrument using occurrences in messages of a reference associated with the financial market index and/or references associated with financial market instruments included in the market index. The percentage increase, alone or in combination with the sentiment prediction, can be used to determine a price of the index and/or a trend associated with the market index.

Embodiments of the present disclosure can be applied to different types of messages or data to bubble up the acceleration of the incoming data from data providers 202. By way of one non-limiting example, the functionality described herein can be used to select web hyperlinks, e.g., a hyperlink to a web page containing information and/or content associated with a financial market instrument and/or financial market entity, instead of or in addition to identifying financial market instrument references. By way of a further non-limiting example, received messages can be examined to identifying web hyperlinks contained in the messages, and web hyperlinks that are the most referenced, e.g., as identified using a percentage change value, in the analyzed messages can be identified and presented to users. While the hyperlink can be a link to a web page containing financial market information, it should be apparent that the hyperlink can be a link to other content.

Figure 5:
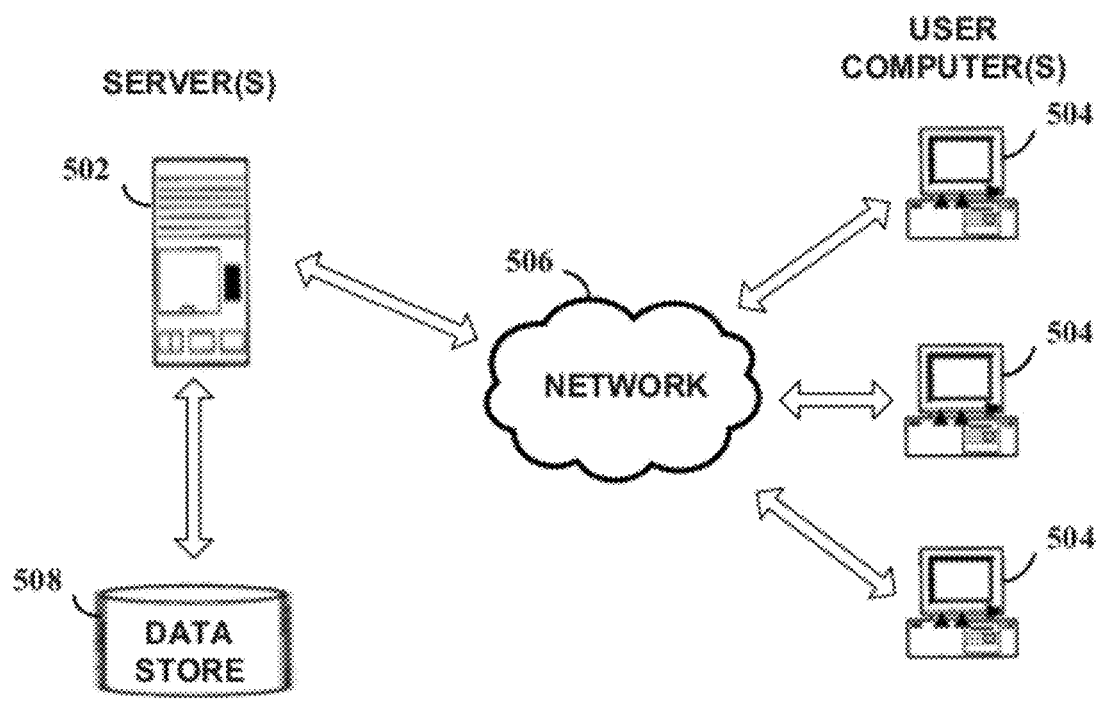
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers 210, user devices 212 or other computing device, 502 are configured to comprise functionality described herein. For example, a computing device 502 can be configured as receiver 204, analyzer 208 and/or server 210, which operates as discussed herein in accordance with one or more embodiments of the present disclosure. The same or another computing device 502 can be associated with one or more of data store 508, which can correspond with data store 204, for example. It should be apparent that one or more of the receiver 204, analyzer 208 and/or server 210 can be the same computing device 502, or can be a different computing device 502.

Computing device 502 can serve content, e.g., GUI 102, to user computing devices 504 using a browser application via a network 506. Data store 508, which can correspond to data store 204, can be used to store data from data provider(s) 202, data generated analyzer 208 and/or receiver 204 executing functionality such as that shown in FIG. 3, etc., as well as program code to configure a server 502 to execute the receiver 204, analyzer 208 and/or server 210.

The user computer 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computer 504 can include one or more processors, memory, a removable media reader, network interface, display and interface, and one or more input devices, e.g., keyboard, keypad, mouse, etc. and input device interface, for example. One skilled in the art will recognize that server 502 and user computer 504 may be configured in many different ways and implemented using many different combinations of hardware, software, or firmware.

In accordance with one or more embodiments, a computing device 502 can make a user interface available to a user computer 504 via the network 1206. The user interface made available to the user computer 504 can include content items, hyperlinks and/or identifiers (e.g., URLs) in accordance with one or more embodiments of the present invention. In accordance with one or more embodiments, computing device 502 makes a user interface available to a user computer 504 by communicating a definition of the user interface to the user computer 504 via the network 506. The user interface definition can be specified using any of a number of languages, including without limitation a markup language such as Hypertext Markup Language, scripts, applets and the like. The user interface definition can be processed by an application executing on the user computer 504, such as a browser application, to output the user interface on a display coupled, e.g., a display directly or indirectly connected, to the user computer 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 5. Alternatively, embodiments of the present disclosure can be implemented other environments, e.g., a peer-to-peer environment as one non-limiting example.

Figure 6:
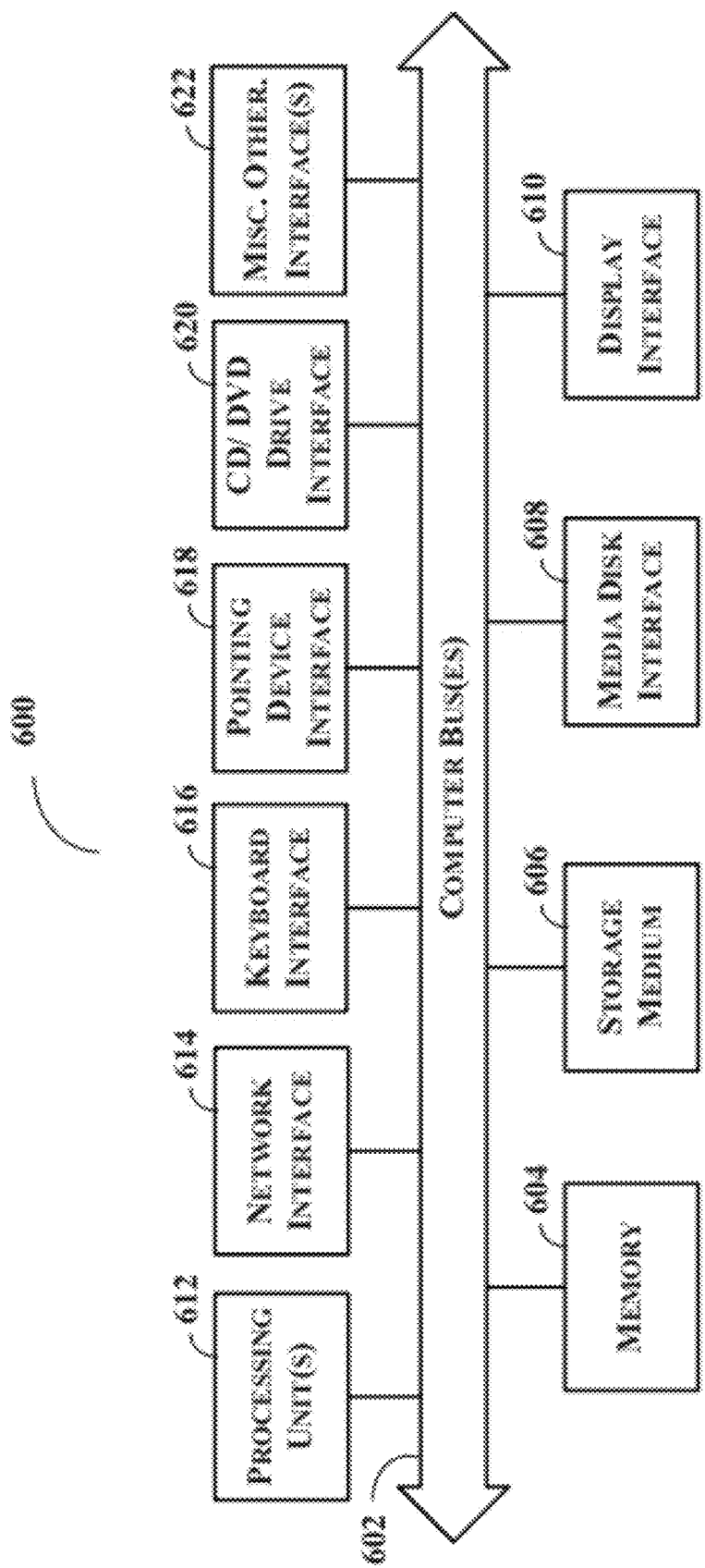
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 602 or user computer 604, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps.

Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    (a) determining, by at least one computing device and for a financial market instrument, a number of messages of a plurality of messages occurring during a time span and containing a reference to the financial market instrument, the plurality of messages including messages from at least one social networking service;
    (b) determining, by the at least one computing device and for the financial market instrument, a time span average, the time span average being a ratio of the determined number of messages occurring during the time span and containing the financial market instrument reference over a number of time intervals into which the time span is divided;
    (c) determining, by the at least one computing device and for the financial market instrument, a message count for a selected time interval of the time intervals, the selected time interval's message count indicating a number of the messages from the plurality of messages occurring during the selected time interval and containing the reference to the financial market instrument;
    (d) determining, by the at least one computing device and for the financial market instrument, a percentage change using the selected time interval's message count and the time span average;
    (e) comparing, by the at least one computing device, a plurality of percentage changes corresponding to a plurality of financial market instruments including the financial market instrument, wherein the comparing comprises selecting a set of financial market instruments, each of the selected financial market instruments having a greater percentage change than unselected ones of the plurality of financial market instruments; and
    (f) making available, by the at least one computing device for presentation to one or more users, the financial market instrument reference of each of the selected financial market instruments.

2. The method of claim 1, further comprising:
    selecting a new set of financial market instruments, by the at least one computing device, comprising:
        identifying a new time span by shifting the time span by a time increment; and
        repeating (a) to (f) using an updated plurality of messages as the plurality of messages, the updated plurality of messages occurring during the new time span.

3. The method of claim 1, further comprising:
    determining, by the at least one computing device and for each of the financial market instruments of the plurality of financial market instruments, a sentiment weighting using the messages occurring during the selected time interval and containing the reference to the financial market instrument, the percentage change being determined by further using the sentiment weighting.

4. The method of claim 1, wherein the financial market instrument is a financial market index.

5. The method of claim 4, the determining, for the financial market instrument, a percentage change further comprising determining, for the financial market index, a percentage change, the method further comprising:
    determining a pricing associated with the financial market index using the percentage change determined for the financial market index.

6. The method of claim 1, further comprising:
    determining, by at least one computing device and for a hyperlink, a number of the messages of the plurality of messages occurring during the time span and containing the hyperlink, the plurality of messages including messages from at least one social networking service;
    determining, by the at least one computing device and for the hyperlink, a time span average, the time span average being a ratio of the determined number of messages occurring during the time span and containing the hyperlink over a number of time intervals into which the time span is divided;
    determining, by the at least one computing device and for the hyperlink, a message count for a selected time interval of the time intervals, the selected time interval's message count indicating a number of the messages from the plurality of messages occurring during the selected time interval and containing the hyperlink;
    determining, by the at least one computing device and for the hyperlink, a percentage change using the selected time interval's message count and the time span average;
    comparing, by the at least one computing device, a plurality of percentage changes corresponding to a plurality of hyperlinks including the hyperlink, the comparing selecting a set of hyperlinks, each of the selected hyperlinks having a greater percentage change than unselected ones of the plurality of hyperlinks; and
    making available, by the at least one computing device for presentation to one or more users, the selected hyperlinks.

7. The method of claim 1, wherein the percentage change comprises a percentage increase.

8. A system comprising:
    at least one computing device comprising one or more processors to execute and memory to store instructions to:
        (a) determine, for a financial market instrument, a number of messages of a plurality of messages occurring during a time span and containing a reference to the financial market instrument, the plurality of messages including messages from at least one social networking service;
        (b) determine, for the financial market instrument, a time span average, the time span average being a ratio of the determined number of messages occurring during the time span and containing the financial market instrument reference over a number of time intervals into which the time span is divided;
        (c) determine, for the financial market instrument, a message count for a selected time interval of the time intervals, the selected the interval's message count indicating a number of the messages from the plurality of messages occurring during the selected time interval and containing the reference to the financial market instrument;
        (d) determine, for the financial market instrument, a percentage change using the selected time interval's message count and the time span average;
        (e) compare a plurality of percentage changes corresponding to a plurality of financial market instruments including the financial market instrument, wherein the comparing comprising selecting a set of financial market instruments, each of the selected financial market instruments having a greater percentage change than unselected ones of the plurality of financial market instruments; and (f) make available, for presentation to one or more users, the financial market instrument reference of each of the selected financial market instruments.

9. The system of claim 8, the at least one computing device comprising one or more processors to further execute and memory to further store instructions to:
select a new set of financial market instruments, comprising:
identifying a new time span by shifting the time span by a time increment; and
repeating (a) to (f) using an updated plurality of messages as the plurality of messages, the updated plurality of messages occurring during the new time span.

10. The system of claim 8, the at least one computing device comprising one or more processors to further execute and memory to further store instructions to:
determine, for each of the financial market instruments of the plurality of financial market instruments, a sentiment weighting using the messages occurring during the selected time interval and containing the reference to the financial market instrument, the percentage change being determined by further using the sentiment weighting.

11. The system of claim 8, wherein the financial market instrument is a financial market index.

12. The system of claim 11, the instructions to determine, for the financial market instrument, a percentage change further comprising instructions to determine, for the financial market index, a percentage change, the-at least one computing device comprising one or more processors to further execute and memory to further store instructions to:
determine a pricing associated with the financial market index using the percentage change determined for the financial market index.

13. The system of claim 8, the at least one computing device comprising one or more processors to further execute and memory to further store instructions to:
determine, for a hyperlink, a number of the messages of the plurality of messages occurring during the time span and containing the hyperlink, the plurality of messages including messages from at least one social networking service;
determine, for the hyperlink, a time span average, the time span average being a ratio of the determined number of messages occurring during the time span and containing the hyperlink over a number of time intervals into which the time span is divided;
determine, for the hyperlink, a message count for a selected time interval of the time intervals, the selected time interval's message count indicating a number of the messages from the plurality of messages occurring during the selected time interval and containing the hyperlink;
determine, for the hyperlink, a percentage change using the selected time interval's message count and the time span average;
compare a plurality of percentage changes corresponding to a plurality of hyperlinks including the hyperlink, the comparing selecting a set of hyperlinks, each of the selected hyperlinks having a greater percentage change than unselected ones of the plurality of hyperlinks; and
make available, for presentation to one or more users, the selected hyperlinks.

14. The system of claim 8, wherein the percentage change comprises a percentage increase.

15. A computer readable non-transitory storage medium for tangibly storing thereon computer readable instructions that when executed cause at least one processor to:
(a) determine, for a financial market instrument, a number of messages of a plurality of messages occurring during a time span and containing a reference to the financial market instrument, the plurality of messages including messages from at least one social networking service;
(b) determine, for the financial market instrument, a time span average, the time span average being a ratio of the determined number of messages occurring during the time span and containing the financial market instrument reference over a number of time intervals into which the time span is divided;
(c) determine, for the financial market instrument, a message count for a selected time interval of the time intervals, the selected time interval's message count indicating a number of the messages from the plurality of messages occurring during the selected time interval and containing the reference to the financial market instrument;
(d) determine, for the financial market instrument, a percentage change using the selected time interval's message count and the time span average;
(e) compare a plurality of percentage changes corresponding to a plurality of financial market instruments including the financial market instrument, wherein the comparing comprising selecting a set of financial market instruments, each of the selected financial market instruments having a greater percentage change than unselected ones of the plurality of financial market instruments; and
(f) make available, for presentation to one or more users, the financial market instrument reference of each of the selected financial market instruments.

16. The computer readable non-transitory storage medium of claim 15, the computer readable instructions that when executed further cause at least one processor to:
select a new set of financial market instruments, comprising:
identifying a new time span by shifting the time span by a time increment; and
repeating (a) to (f) using an updated plurality of messages as the plurality of messages, the updated plurality of messages occurring during the new time span.

17. The computer readable non-transitory storage medium of claim 15, the computer readable instructions that when executed further cause at least one processor to:
determine, for each of the financial market instruments of the plurality of financial market instruments, a sentiment weighting using the messages occurring during the selected time interval and containing the reference to the financial market instrument, the percentage change being determined by further using the sentiment weighting.

18. The computer readable non-transitory storage medium of claim 15, wherein the financial market instrument is a financial market index.

19. The computer readable non-transitory storage medium of claim 18, the instructions to determine, for the financial market instrument, a percentage change further comprising instructions to determine, for the financial market index, a percentage change, the computer readable instructions that when executed further cause at least one processor to:
determine a pricing associated with the financial market index using the percentage change determined for the financial market index.

20. The computer readable non-transitory storage medium of claim 15, the computer readable instructions that when executed further cause at least one processor to:

determine, for a hyperlink, a number of the messages of the plurality of messages occurring during the time span and containing the hyperlink, the plurality of messages including messages from at least one social networking service;

determine, for the hyperlink, a time span average, the time span average being a ratio of the determined number of messages occurring during the time span and containing the hyperlink over a number of time intervals into which the time span is divided;

determine, for the hyperlink, a message count for a selected time interval of the time intervals, the selected time interval's message count indicating a number of the messages from the plurality of messages occurring during the selected time interval and containing the hyperlink;

determine, for the hyperlink, a percentage change using the selected time interval's message count and the time span average;

compare a plurality of percentage changes corresponding to a plurality of hyperlinks including the hyperlink, the comparing selecting a set of hyperlinks, each of the selected hyperlinks having a greater percentage change than unselected ones of the plurality of hyperlinks; and make available, for presentation to one or more users, the selected hyperlinks.

21. The computer readable non-transitory storage medium of claim 15, wherein the percentage change comprises a percentage increase.

* * * * *